Aug. 30, 1938.   W. J. KERR   2,128,417
AUTOMATIC CONTROL FOR TIRE MOLDS AND THE LIKE
Filed Sept. 28, 1935
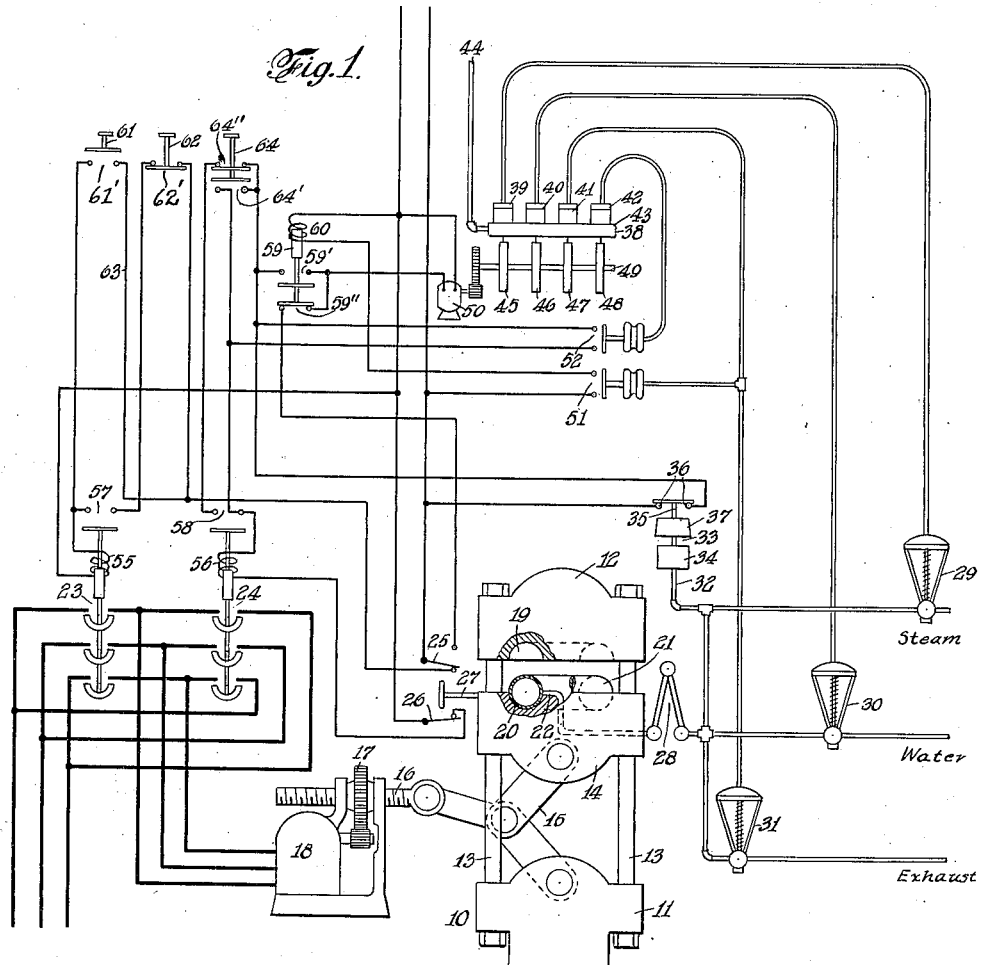
INVENTOR.
WILLIAM J. KERR
BY
ATTORNEY.

Patented Aug. 30, 1938

2,128,417

UNITED STATES PATENT OFFICE 2,128,417

AUTOMATIC CONTROL FOR TIRE MOLDS AND THE LIKE

William J. Kerr, Waterbury, Conn., assignor to The Bristol Company, Waterbury, Conn., a corporation of Connecticut Application September 28, 1935, Serial No. 42,557

4 Claims. (Cl. 18—17)

This invention relates to the automatic control of apparatus normally operating in recurrent cycles essential to the carrying out of a discontinuous process, and more particularly to the control of presses carrying molds such as are used, for example, in the vulcanizing of automobile tires and like articles. In the manufacture of tires and similar hollow products it is customary to enclose the uncured or "green" article, after fabrication, in a separable mold structure; and then to admit to the interior thereof a curing medium such as steam or hot water under pressure, maintaining the curing medium within the article for a predetermined time, whereupon the same is vented before opening of the mold. In the interests of efficiency of production and with a high quality of product in view, it is desirable that the mold be opened and the cured article removed at the earliest possible moment after completion of the cure.

In automatically controlled molds for the vulcanization or curing of automobile tires, it is customary to provide a process-cycle control instrument governing the several events in the cycle of operation on a predetermined time basis, the timing being predetermined more or less on the basis of experience, and, once established, being incapable of modification without a readjustment of cams or other timing elements in the control instrument—a matter generally requiring considerable experimentation.

In the event of conditions in the mold becoming such as would permit its opening and the removal of the cured product at a time earlier than that set up on the cam structure, the automatic devices take no cognizance of this fact, and time which might be applied to a subsequent cure is thereby wasted, to the detriment of general efficiency of operation.

It is an object of this invention to provide, in a system of process cycle control embodying a timing element governing the several events in a curing cycle, including the closing and locking of the mold and the admission and subsequent shutting off and exhausting of the curing medium, means for effecting the unlocking and releasing of the mold immediately conditions within the same reach a predetermined stage.

In the accompanying drawing which illustrates the invention:

Fig. 1 is a diagrammatic view showing a tire mold associated with an electrically operated platen press, the same being equipped with a control system embodying the features of the invention.

Figs. 2 and 3 show on a relatively enlarged scale portions of two cam surfaces and associated elements forming an essential part of the invention.

Fig. 4 is a diagrammatic representation of an alternative embodiment of a part of the system.

Referring to the drawing, more particularly Fig. 1 thereof, 10 designates a mechanical platen press, adapted for electrical operation, and carrying mold members for the vulcanization of automobile tires. This press embodies a stationary base portion 11, a top portion 12, rigidly and definitely maintained in fixed relationship by bolts 13, and a movable platen member 14, running upon and guided by the bolts 13 from an open botton position to a position of engagement with the top portion 12. A toggle joint 15 linked to a screw member 16, driven by a rotating nut 17 from a reversible electric motor 18, serves to open and to close the press, as well as to lock it in its closed position.

An annular space 19 in the lower face of top portion 12 coacts with a similar annular space 20 in the platen member 14, when the press is in its closed position, to form a mold having a toroidal cavity suited to contain an automobile tire 21 to be vulcanized. The two sections of the mold are permanently heated by the circulation of steam or other medium through channels not shown in the drawings, while the interior space of the tire 21 is adapted to have admitted thereto through a connecting tube 22 a heated medium under pressure, serving the double purpose of maintaining the temperature of the inner walls of the tire and of inflating it into intimate contact with the interior surface of the mold.

The motor 18 is driven from a three-phase power supply through either of two magnetic contactors 23 and 24, these being connected to the supply circuit in such a manner that when contactor 23 is closed the motor will rotate in a sense to close and lock the press, and when contactor 24 is closed the motor will rotate in a sense to unlock and open the press. Limit switches 25 and 26, actuated by member 27 carried by the platen member 14, have electrical connections as will hereinafter be set forth in more detail, the same serving to release the contactors 23 and 24, preventing further operation of the motor 18 as the platen 14 reaches the positions corresponding respectively to the closed and open conditions of the mold.

A flexible joint member 28 provides connection between the tube 22, communicating with the interior of the tire 21, and a plurality of pneumatically operated valves 29, 30 and 31, these being of the "reverse acting" type, in which the application of a control fluid under pressure causes the valves to assume an open position. The said valves control the connection respectively with a source of steam under pressure, a source of hot water under pressure, and the exhaust, in response to such control pressures as may be applied to them as hereinafter set forth.

Communicating with the interior of the tire 21 and joint member 28 through a conduit 32 is a pressure-actuated electric switch 33, which may consist of a small cylinder 34 having therein a piston member whose rod 35 is arranged to open electrical contacts 36 when pressure within the cylinder exceeds a value predetermined by a weight 37 mounted integrally with the piston rod 35 and arranged to be displaced in a vertical sense in opposition to the force of gravitation.

A process-cycle control instrument or cycle controller 38 embodies a plurality of pilot valves 39, 40, 41 and 42 (preferably of the type set forth in U. S. Letters Patent No. 1,890,494, granted December 13, 1932,) and is supplied with a control fluid (for example, air at a pressure of approximately 15 lbs. per sq. inch) through a manifold 43 from a source 44. These valves have operatively associated therewith a plurality of corresponding cam members 45, 46, 47 and 48, mounted on a common shaft 49 adapted to be driven at a constant speed by electric motor 50. The pilot valves 39, 40 and 41, furthermore, are operatively connected by conduits to the pneumatically-actuated valves 29, 30 and 31; and a pressure-actuated switch, having normally open contacts 51, communicates with the conduit connecting pilot valve 41 with exhaust valve 31. The pilot valve 42 is connected to a pressure-actuated switch having normally open contacts 52.

The interconnection between the cycle control instrument 38 and the several pneumatically-actuated devices is such as to effect operation of the latter in the following manner: Each of the four cams has a peripheral portion of minimum radius and a peripheral portion or "step" of maximum radius; and each of the pilot valves is normally closed when engaging the portion of its corresponding cam having a minimum radius, and is opened in response to the valve being engaged by the step or portion having a maximum radius.

Thus, upon the cam 45 rotating to a position where its greater radius engages the valve 39, the latter will be opened, applying control fluid to the pneumatically-operated valve 29, causing it to be opened, and admitting steam to the interior of tire 21. Similarly, cam 46, acting upon pilot valve 40, causes valve 30 to be opened and water to be admitted to the tire; while opening of the exhaust valve 31, by action of cam 47 upon pilot valve 41, causes the interior of the tire to be vented and drained.

The order and timing of admission of steam and water to the tire form no part of this invention, which is concerned wholly with the manner of terminating the cycle; and the relationships between the actuation of the exhaust valve 31 and the switches embodying contacts 51 and 52 will be better understood by reference to Figs. 2 and 3, in which are shown portions of the contours of cams 47 and 48 in normal operative relationship, as indicated by lines a—a, b—b, and c—c.

The cam 47, as shown, bears a step 53 adapted to actuate the pilot valve 41, thereby opening the exhaust and also closing the contacts 51 at a predetermined instant in the cycle, as indicated by the line a—a, presumably some time after steam and water have been shut off. A step 54 on the cam 48, Fig. 3, is arranged to actuate the pilot valve 42 at a time subsequent to the opening of pilot valve 41, as indicated by the line b—b, thereby closing the contacts 52, this step being relatively short—terminating at the line c—c— so that as the cam rotates, the closing of contacts 52 may be of only momentary duration.

The auxiliary electrical control elements are as follows: The contactor 23 is actuated by an electromagnetic operating coil 55 in such a manner that when the latter is energized the contactor is in a closed position. The contactor 24 is similarly actuated by a coil 56. The former contactor 23 carries an auxiliary contact 57 and the contactor 24 an auxiliary contact 58, each of these being closed at the same time as the main contacts of its respective unit are closed.

A relay 59, actuated by an operating coil 60, has two sets of contacts, an upper set 59' normally open and designed to be closed when the coil 60 is energized, and a lower set 59'' normally closed and designed to be opened when the coil 60 is energized. Both sets each have one contact connected to a common conductor and thereby to one terminal of the motor 50.

Primary and emergency manual control of the system are provided by three spring-return push-button switches, as follows:

A "starting and closing" switch 61 which has a single set of contacts 61', normally open.

A "stop" switch 62 which has a single set of contacts 62', normally closed, and two switches each having a contact connected to a common conductor 63.

An "open" switch 64 which has two sets of contacts 64' and 64'', the former set being normally open and the latter one normally closed. Both sets each have a contact connected to a common conductor and thence to one terminal of the pressure switch 33.

The pressure-actuated switch 33 may be replaced by a temperature-actuated switch 65, as shown in Fig. 4, this consisting of a contact system 66 actuated through an arm 67 from a Bourdon spring 68. The interior of the Bourdon spring is placed in communication through a capillary tube 69 with a closed chamber or bulb 70 containing an expansible or volatile pressure fluid such as carbon disulphide or xylene, as is common in thermometers and temperature controllers of this type. The contacts 66 will then be sensitive to the temperature to which the chamber 70 is exposed; and if this be placed in the stream of the curing agent flowing to or from the tire in the mold, the temperature of this agent will control the open or closed condition of the contacts, so that the latter may be set to open and remain open at all times except when the said temperature is below a predetermined limit.

Limit switch 25 is of the single-pole double-throw class and provides a connection between one side of a source of power for control and the common conductor 63 at all times except when the press is fully closed, and between that side of the source and the normally closed contacts of relay 59, when the press is fully closed. Limit switch 26 is of the single-pole single-throw class; and, at all times except when the press is fully open, serves to connect the operating coil 56 of the contactor 24 to the side of the source opposite to that connected to the common point of switch 25. The function and relation of the remaining connections will be best understood by a consideration of the normal cycle of operation.

Assuming the press to be standing in its open position with a "green" tire in place having its interior connected to the tube 22 for inflation, the contacts of limit switch 26 will be open, the lower 61' open, switch contacts 62' closed, switch contact 64' open and contacts 64" closed, relay 60 de-energized, with its upper contacts open and lower contacts closed, the contacts 51 and 52 of the pressure switches open, the contacts 36 of pressure switch 33 closed, the contactors 23 and 24 de-energized and their contacts, both main and auxiliary, open. Motor 50 will then be at rest with the cam shaft in a position when the four pilot valves will be closed, so that steam and water valves 29 and 30 and exhaust valve 31 will be closed and the contacts 51 and 52 open.

Operation is initiated by the "starting and closing" switch 61 being manually depressed by the operator, completing the circuit to operating coil 55 of contactor 23 in series with limit switch 25. As the main contacts of contactor 23 close, causing the motor 18 to operate in a sense to close the press, contact 57 will also close, bridging the switch contacts 61' through the normally closed switch contacts 62'. Switch 61, therefore, after a momentary contact, may be released and the motor 18 will continue to operate, bringing the platen 14 into engagement with the top member 12 and, through the action of the toggle joint 15, locking the mold in its closed position. As the press assumes the closed position, the limit switch 25 will open its lower contacts releasing the contactor 23 and bringing the motor 18 to rest, and at the same time closing its upper contacts, which will energize the motor 50 through the normally closed contacts of relay 59, thus placing the cycle controller in operation.

As the cams 45 and 46 rotate, pilot valves 39 and 40 will be opened and closed in proper sequence and with a predetermined timing, causing valves 29 and 30 to admit steam and water to the tire as governed by the required conditions of the cure, all of which, as hereinbefore stated, forms no part of this invention. During the curing period, the pressure of the fluid within the tire will be communicated to the switch 33 to maintain its contacts 36 in an open position, thus interrupting the only circuit through which current may be made available for energizing the coil 56, and thus making it impossible to operate the motor 18 in a sense to unlock the mold.

At the expiration of the curing period, pilot valves 39 and 40 will both be closed, and the pilot valve 41 opened by the step 53 on cam 47 (see a—a, Fig. 2), causing the exhaust valve 31 to be opened and the contents of the tire vented. The opening of pilot valve 41 will also apply control air pressure to the switch for contacts 51 to close the same, thereby energizing the coil 60 of relay 59, and causing the lower contacts 59" thereof to be opened and the upper contacts 59' closed. The opening of the contacts 59" of relay 59 will interrupt the circuit to the cycle controller motor 50; and, while the simultaneous closing of the upper contacts provides an alternative connection for this motor, it will be apparent upon examination of the diagram that so long as the contact 36 of the switch 34 is held open due to the presence of pressure within the tire, the circuit will be incomplete and the motor 50 cannot resume operation. The cycle controller thus will remain at rest with the exhaust valve 31 held open, while the contents of the tire are vented and the pressure therein tends to approach atmospheric.

As the pressure falls to a value predetermined by the setting of pressure-operated switch 33, the weight 37 will overcome the pressure within the cylinder 34, and the moving element 35 will fall, closing the contacts 36, thus completing the circuit of motor 50 through the contacts 59' of relay 59 and again placing the cycle controller in operation.

Similarly it will be seen that if the system has been made subject to temperature conditions, rather than pressure conditions, by the use of the apparatus shown in Fig. 4, the contacts 66 will have opened upon the admission of a heated medium to the tire, and will remain open until the lowering of temperature, as conditions within the tire approach atmospheric conditions, permits the said contacts to close.

As the cam shaft 49 resumes rotation, the step 54 on cam 48, Fig. 3, at a position indicated by the line b—b, will actuate pilot valve 42, admitting air to the pressure switch for contacts 52, closing the latter and completing in series with contacts 36 and limit switch 26 a circuit through coil 56 of contactor 24, thus closing the main contacts of the latter and effecting energization of motor 18 in a sense first to unlock and then to open the mold. The contacts 58 on contactor 24 provide through the normally closed contacts 64" an alternative or maintaining circuit, so that the pressure switch for contacts 52 requires but a momentary impulse in order to initiate the opening action of the press, after which the cycle controller may release valve 42 without interfering with the opening action.

As the valve 41 is closed by the cycle controller simultaneously with the release and closure of valve 42, as indicated by the line c—c in both Figs. 2 and 3, pressure on the exhaust valve 31 will be released, allowing that valve to close; and at the same time the switch for contacts 51 will be opened, releasing the relay 60 and interrupting the current supply to motor 50, thus bringing the cycle controller to rest in its initial position. As the press reaches its full open position, the limit switch 26 will be opened, de-energizing the coil 56 and releasing the contactor 24, so that the motor 18 will come to rest with the mold in its original open position; and thus completing and terminating the cycle of operation.

The function of the "stop" switch 62 is to open the maintaining circuit of the coil 55 in case of emergency, thus bringing the motor 18 to rest and stopping the action of the mold at any time during the closing operation. Manual operation of the "open" switch 64 will open its upper contacts 64", thus rendering the maintaining circuit of coil 56 inoperative, and will close its lower contacts 64', thus acting to bridge the contacts 52 and initiate opening action of the mold at any time the contacts 36 of pressure switch 33 are closed, signifying that conditions in the mold are such that it may be opened without hazard.

Thus there has been provided a system of cycle control for molds in which tires or the like are cured under internal pressure, in which the opening of the mold at the termination of a cure is governed solely by conditions within the tire.

I claim:

1. Means for controlling the opening of pressure-treating mechanism embodying a mold having relatively movable members affording a space therebetween to receive an article to be treated therein with a fluid under pressure, together with means for venting said space, said controlling means including control sequence mechanism intermittently operable during a cycle for controlling said venting means to initiate the venting of the fluid from said space and determine the time of opening of the said relatively movable members thereof, an electric motor for driving said control sequence mechanism, a source of power supply for the motor and connected thereto, electrical relay means responsive to said venting means to interrupt said motor connection and to provide in part an alternative circuit to said motor from its said source of power, and means responsive to the pressure of the fluid within said space to complete said alternative circuit.

2. Means for controlling the opening of pressure-treating mechanism embodying a mold having relatively movable members affording a space therebetween to receive an article to be treated therein with a fluid under elevated pressure and temperature conditions, together with means for venting said space, said controlling means including control sequence mechanism intermittently operable during a cycle for controlling said venting means to initiate the venting of the fluid from said space and determine the time of opening of the said relatively movable members thereof, an electric motor for driving said control sequence mechanism, a source of power supply for the motor and connected thereto, electrical relay means responsive synchronously with the operation of said venting means to interrupt said motor connection and to provide in part an alternative circuit to said motor from its said source of power, and means responsive to one of said conditions of the fluid within said space to complete said alternative circuit.

3. Means for controlling the opening of a pressure-treating mechanism embodying a mold adapted for operation in successive cycles and having relatively movable members affording a space therebetween to receive an article to be treated therein with a fluid under elevated pressure and temperature conditions, said controlling means including control sequence mechanism, an electric motor adapted for driving the same intermittently during a cycle of operation, a circuit for said motor, a relay for alternatively introducing in said circuit a selected one of two current paths, one of said paths including circuit controlling means subject to motion of one of said mold members and the other of said paths including circuit controlling means subject to one of said conditions of said fluid within the mold, together with a circuit for operating said relay and including circuit controlling means operable by said sequence mechanism.

4. Means for controlling the opening of a pressure-treating mechanism embodying a mold adapted for operation in successive cycles and having relatively movable members affording a space therebetween to receive an article to be treated therein with a fluid under elevated pressure and temperature conditions, and electric motor means for operating said mold members, said controlling means including electrically actuated switching mechanism for operating said motor means, circuits for carrying actuating power to said switching mechanism, the energization of one of said circuits serving to open said mold, and control sequence mechanism, an electric motor adapted for driving the same intermittently during a cycle, a circuit for said last-named motor, a relay for alternatively introducing in said circuit a selected one of two current paths, one of said paths including circuit controlling means subject to motion of one of said mold members and the other of said paths including circuit controlling means subject to one of said conditions of said fluid within the mold, together with a circuit for operating said relay and including circuit controlling means operable by said sequence mechanism.

WILLIAM J. KERR.